T. J. CARROLL.
PIPE ATTACHMENT.
APPLICATION FILED JULY 9, 1917.
1,253,145.
Patented Jan. 8, 1918.
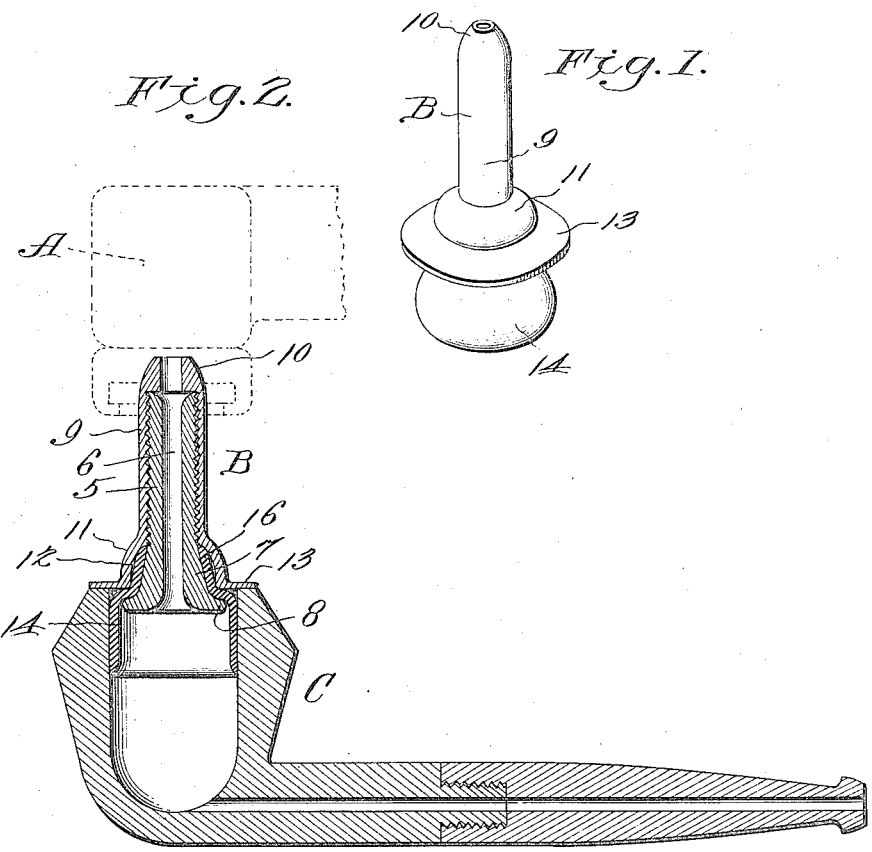
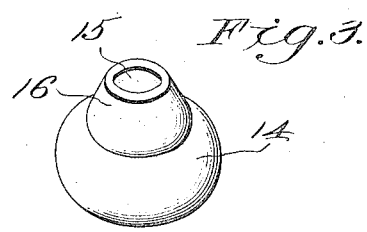
WITNESSES
INVENTOR
T. J. Carroll,
BY Victor J. Evans
ATTORNEY

UNITED STATES PATENT OFFICE.

THOMAS J. CARROLL, OF DEWEY, OKLAHOMA.

PIPE ATTACHMENT.

1,253,145.  Specification of Letters Patent.  Patented Jan. 8, 1918.

Application filed July 9, 1917. Serial No. 179,467.

*To all whom it may concern:*

Be it known that I, THOMAS J. CARROLL, a citizen of the United States, residing at Dewey, in the county of Washington and State of Oklahoma, have invented new and useful Improvements in Pipe Attachments, of which the following is a specification.

This invention relates to an attachment for pipes of the type employed for smoking tobacco.

The primary object of the invention is to provide an attachment for a pipe of this character which is in the form of a coupling to enable the pipe to be connected with a device for supplying fluid under pressure, whereby the fluid may be passed through the pipe for the cleaning thereof.

Another object of the invention is to provide an attachment which may be employed for this purpose in connection with any of the pipes now in common use and is so constructed that it may be readily connected with the hose associated with the mechanically driven pumps for supplying air to automobile tires at service stations.

A further object of the invention is to provide an attachment wherein a cup for insertion within the bowl of the pipe may be expanded to such an extent by the fluid passing through the pipe as to prevent the escape of the fluid between the wall of the bowl and cup.

With these and other objects in view, the invention resides in the novel combination and arrangement of parts, which will be hereinafter described and particularly pointed out in the claim.

The preferred embodiment of the invention has been illustrated in the accompanying drawing, although no restriction is necessarily made to the precise details of construction therein shown, as changes, alterations, and modifications, within the scope of the claim may be resorted to when desired.

In the drawing:

Figure 1 is a perspective view of an attachment for tobacco pipes constructed in accordance with the invention.

Fig. 2 is a longitudinal sectional view through a pipe showing the attachment applied thereto and connected with the discharge end of a hose associated with an air pump at an automobile service station.

Fig. 3 is a detailed perspective view of the cup which forms a part of the attachment.

Like characters of reference denote corresponding parts throughout the several views in the drawing.

Referring now to the drawing in detail, the letter A designates the discharge end of a hose associated with a mechanically driven pump for supplying air to automobile tires at a service station, with the discharge end of the hose having inserted therein the improved attachment B which is applied to a tobacco pipe C to enable the air passing through the hose to be employed to remove from the bowl and stem of the pipe any matter which may have accumulated therein, such as tobacco tar, and the like.

The attachment B includes a stem 5 having extending longitudinally thereof throughout its length, a channel 6, said stem being exteriorly threaded for the greater portion of its length and provided adjacent one end thereof with a cone-shaped head 7 at the base of which is formed a circumferentially extending flange 8. The threads on the stem 5 are engaged with the threads on the interior of a sleeve 9 through which the stem is passed, with the sleeve having formed thereon at one of its ends a nose 10 which when the sleeve is inserted within the discharge end of the hose A is adapted to engage with the valve therein and unseat the same to permit the air from the mechanically driven pump to pass through the channel in the stem 5.

The sleeve 9 has formed thereon adjacent its other end, a circumferentially extending enlargement 11, the inner wall of which is inclined to form a seat 12, with the enlargement having extending circumferentially of its base, a flange 13 which when the attachment is in use, is adapted to bear on the bowl of the pipe C and not only serve to limit the extent to which the attachment may be inserted within the pipe but also as a guard to prevent the accumulated matter within the pipe from escaping from the bowl.

A flexible and elastic cup 14 for insertion within the bowl of the pipe C has the wall thereof curved throughout its length and tapered toward the rim of the cup as shown, whereby when the attachment is in use, the cup may be expanded to such an extent by the air pressure within the bowl as to cause the walls of the cup to firmly bear against the wall of the bowl of the pipe A and prevent the escape of air between the cup and bowl.

The cup 14 is provided at its base with a central opening 15 through which and the opening in a tapered collar 16 extending circumferentially of the opening in the cup, is passed the head 7 on the stem 5, whereby through adjustment of the sleeve 9 on the stem, the collar 16 may be firmly forced against the seat 12, while the base of the cup 14 is firmly forced against the flange 13 by the flange 8, thereby preventing the escape of air from within the bowl between the sleeve and stem and also securing the cup 14 to the sleeve and stem.

When the stem of the tobacco pipe has become clogged and it is desired to remove the obstruction therein, the cup 14 is inserted within the bowl of the pipe until the flange 13 rests upon the rim of the bowl.

The sleeve 9 is now inserted in the discharge end of the hose associated with the mechanically operated pump for supplying air to automobile tires to unseat the valve in the discharge end of the hose, so that the air from the pump may expand the cup 14 and firmly force the walls thereof against the wall of the bowl of the pipe A, thus preventing the escape of the air from within the bowl and enabling the air to force from the stem of the pipe C, any matter which may have accumulated therein.

As soon as the pipe has been cleaned, the sleeve 9 is withdrawn from the discharge end of the hose which allows the cup 14 to contract, so that the attachment may be readily disconnected from the pipe.

From the foregoing description, taken in connection with the accompanying drawing, it is at once apparent that an attachment for pipes has been provided which when applied thereto will enable the pipe to be cleaned by a fluid supplied by a mechanically operated pump, such as is used at automobile service stations for supplying automobile tires with air.

Having thus described the invention, what is claimed as new, is:

A device of the class described comprising an exteriorly threaded stem having a channel extending longitudinally thereof, a conical head adjacent one end of said stem, a circumferentially extending flange at the base of said head, an elastic cup to be received within the bowl of a tobacco pipe having a central opening in its base, a collar on said cup extending circumferentially of said opening through which and the opening in the collar the said head is passed, an interiorly threaded sleeve through which said stem is passed for insertion within the discharge end of a hose associated with a mechanically operated pump for supplying air to automobile tires, a valve actuating nose at one end of the sleeve, an enlargement adjacent the other end of the sleeve providing a seat therein against which said collar is forced by said head, and a circumferentially extending flange on said enlargement against which the base of the cup is forced by the flange on the head adapted to bear on the rim of the bowl of the pipe in which the cup is received.

In testimony whereof I affix my signature.

THOMAS J. CARROLL.